(12) United States Patent
Wu

(10) Patent No.: US 9,272,749 B1
(45) Date of Patent: Mar. 1, 2016

(54) BRAKE STRUCTURE CAPABLE OF ADJUSTING A DISTANCE BETWEEN TWO BRAKE SHOES OF A BICYCLE

(71) Applicant: Da-Hao Wu, Changhua (TW)

(72) Inventor: Da-Hao Wu, Changhua (TW)

(73) Assignee: TEKTRO TECHNOLOGY CORP, Changhua (TW)

( * ) Notice: Subject to any disclaimer, the term of this patent is extended or adjusted under 35 U.S.C. 154(b) by 0 days.

(21) Appl. No.: 14/501,050

(22) Filed: Sep. 30, 2014

(51) Int. Cl.
  B62L 1/06 (2006.01)
  B62L 1/14 (2006.01)

(52) U.S. Cl.
  CPC ........................................ *B62L 1/14* (2013.01)

(58) Field of Classification Search
  CPC ............... B62L 1/06; B62L 1/10; B62L 1/12; B62L 1/14; B62L 1/16; F16D 65/46
  USPC ............. 188/24.19, 2 D, 24.11, 24.15, 24.22, 188/196 M
  See application file for complete search history.

(56) References Cited

U.S. PATENT DOCUMENTS

| 4,263,990 | A | * | 4/1981 | Yoshigai | ................. | F16D 65/45 188/24.19 |
| 4,482,033 | A | * | 11/1984 | Yoshigai | ................... | B62L 1/12 188/196 M |
| 4,852,698 | A | * | 8/1989 | Nagano | ..................... | B62L 1/12 188/196 M |
| 5,425,434 | A | * | 6/1995 | Romano | ................... | B62L 1/16 188/24.15 |
| 5,743,360 | A | * | 4/1998 | Ke | ............................ | B62L 1/14 188/24.19 |
| 7,000,739 | B2 | * | 2/2006 | Ciamillo | .................. | B62L 1/06 188/2 D |

* cited by examiner

*Primary Examiner* — Pamela Rodriguez
(74) *Attorney, Agent, or Firm* — Yuwen Guo

(57) ABSTRACT

A brake structure capable of adjusting a distance between two brake shoes of a bicycle is disclosed. When the screw is screwed in the adjusting hole, the screw is against and pushing the push member, the concave portion of the push member is pushing the roller, and further the roller is rolling to push the horizontal wall to adjust a distance between the first brake shoe and the second brake shoe to be shorter. When the screw is screwed out of the adjusting hole, the push member is pushed back toward the bolt member, and further the horizontal wall is pushed back toward the push member to roll the roller to adjust the distance between the first brake shoe and the second brake shoe to be longer.

1 Claim, 9 Drawing Sheets

BRAKE STRUCTURE CAPABLE OF ADJUSTING A DISTANCE BETWEEN TWO BRAKE SHOES OF A BICYCLE

FIELD OF THE INVENTION

The present invention relates to a bicycle, and more particularly to a brake structure capable of adjusting a distance between two brake shoes of a bicycle.

BACKGROUND OF THE INVENTION

In general, one of the brake shoes of a bicycle may be abraded more seriously after being used for a long time, or two brake shoes do not balance after assembling.

It is difficult or complex to fine tune the distance between two brake shoes. Therefore, the users usually ignore it to adjust.

However, the safety for a rider is not enough. If the brake shoes are not balanced, the friction is not equal and it is easy to reduce the braking efficiency, and then the safety of riders may be influenced.

SUMMARY OF THE INVENTION

Therefore, a brake structure capable of adjusting a distance between two brake shoes of a bicycle is provided. It is not necessary to detach the brake structure and easy to adjust the distance between the first brake shoe and the second brake shoe.

A brake structure capable of adjusting a distance between two brake shoes of a bicycle is disclosed and comprises a first arm, having a first lower extending portion, a first upper extending portion connected with the first lower extending portion, and a first right extending portion connected to the connection of the first lower extending portion and the first upper extending portion, a first pivoting hole is disposed at one end of the first lower extending portion adjacent to the first upper extending portion in a front-back direction, a first connecting hole is disposed at one end of the first lower extending portion distant from the first upper extending portion in a left-right direction for connecting a first brake shoe, an adjusting hole is disposed at one end of the first right extending portion distant from the first lower extending portion in an up-down direction, and an elongated round hole is disposed at one end of the first right extending portion distant from the connection of the first lower extending portion and the first upper extending portion, and an axial direction of the elongated round hole is in the up-down direction; a second arm, having a second lower extending portion and a second left extending portion, a second pivoting hole is disposed at one end of the second lower extending portion adjacent to the second left extending portion in the front-back direction, a second connecting hole is corresponding to the first connecting hole and disposed at one end of the second lower extending portion distant from the second left extending portion for connecting a second brake shoe, one end of the second left extending portion distant from the second lower extending portion and one end of the first upper extending portion distant from the first lower extending portion are separately connected with a brake cable, and one end of the second left extending portion adjacent to the second lower extending portion forms a vertical wall and a horizontal wall connected with each other; a push member, disposed between the end of first right extending portion distant from the first lower extending portion and the horizontal wall, a bolt member is passed through the elongated round hole and the push mem-ber to fix the push member, a screw is adjustably disposed inside the adjusting hole and against a top of the push member, and a concave portion is formed at the bottom of the push member; and a roller, pivotedly received in the concave portion of the push member, two ends of the roller are respectively and rollably against the horizontal wall and the concave portion.

When the screw is screwed in the adjusting hole, the screw is against and pushing the push member, the concave portion of the push member is pushing the roller, and further the roller is rolling to push the horizontal wall to adjust a distance between the first brake shoe and the second brake shoe to be shorter.

When the screw is screwed out of the adjusting hole, the push member is pushed back toward the bolt member, and further the horizontal wall is pushed back toward the push member to roll the roller to adjust the distance between the first brake shoe and the second brake shoe to be longer.

In some embodiments, the first pivoting hole and a second pivoting hole are detachably fastened at a front fork or a rear fork.

DESCRIPTION OF THE PREFERRED EMBODIMENT

Figure 1:
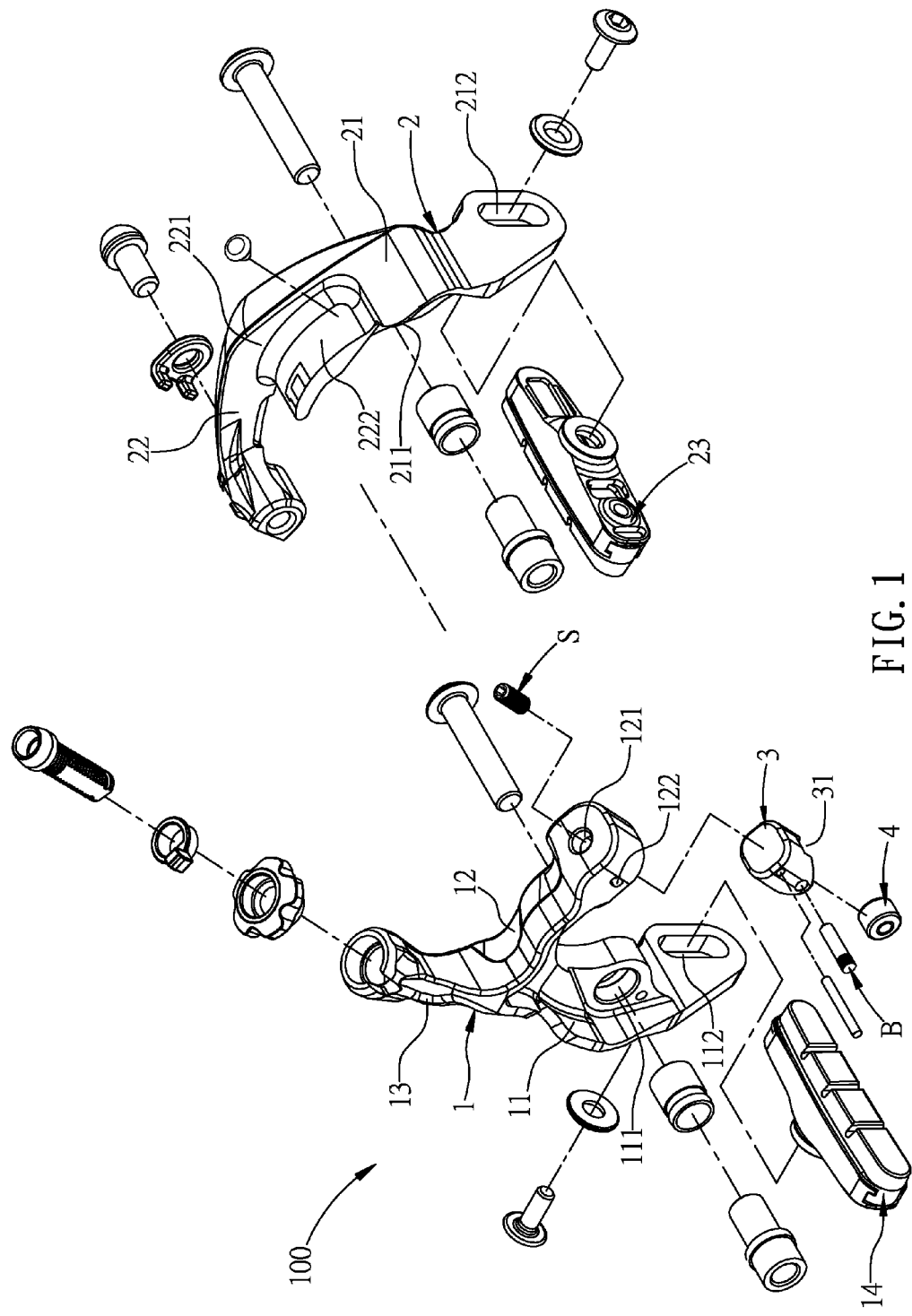
FIG. 1 is an exploded view of a brake structure capable of adjusting a distance between two brake shoes of a bicycle according to present invention.
Figure 2:
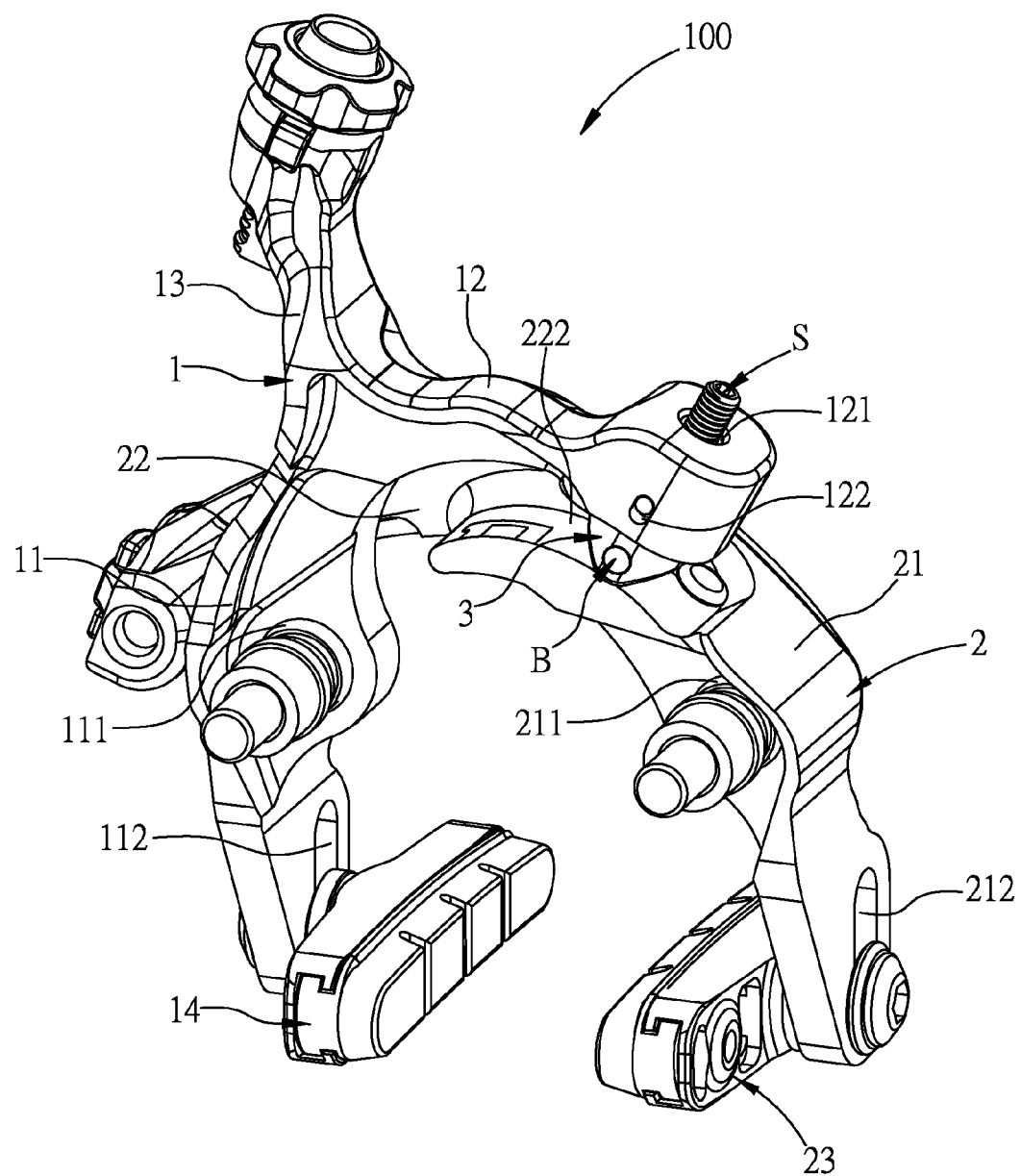
FIG. 2 is a perspective view of the brake structure capable of adjusting a distance between two brake shoes of a bicycle according to present invention.
Figure 3:
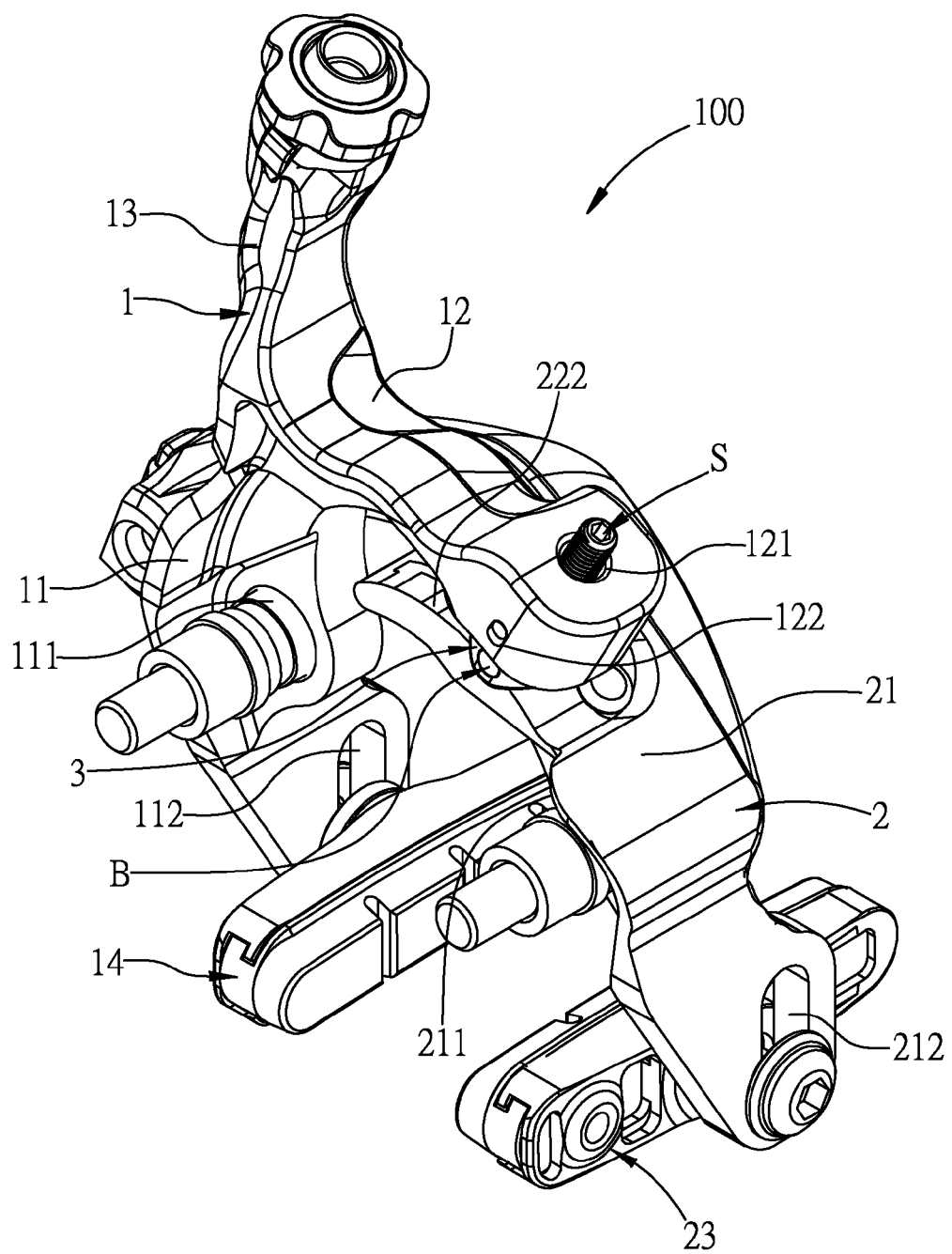
FIG. 3 is another perspective view of the brake structure capable of adjusting a distance between two brake shoes of a bicycle according to present invention.
Figure 4:
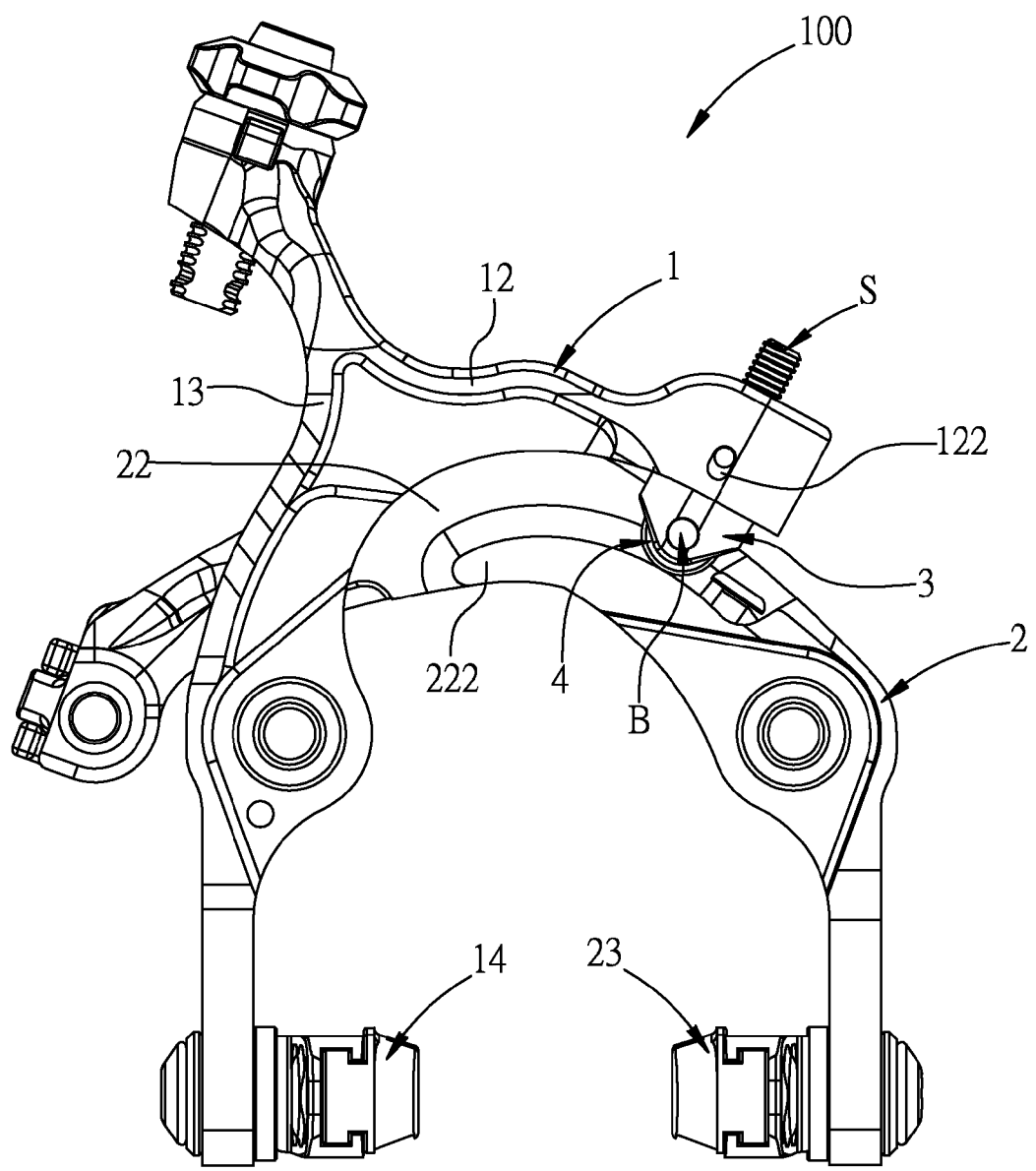
FIG. 4 is a front view of the brake structure capable of adjusting a distance between two brake shoes of a bicycle according to present invention.

FIG. 1 is an exploded view of a brake structure capable of adjusting a distance between two brake shoes of a bicycle according to present invention. FIG. 2 is a perspective view of the brake structure capable of adjusting a distance between two brake shoes of a bicycle according to present invention. FIG. 3 is another perspective view of the brake structure capable of adjusting a distance between two brake shoes of a bicycle according to present invention. FIG. 4 is a front view of the brake structure capable of adjusting a distance between two brake shoes of a bicycle according to present invention.

Figure 5:
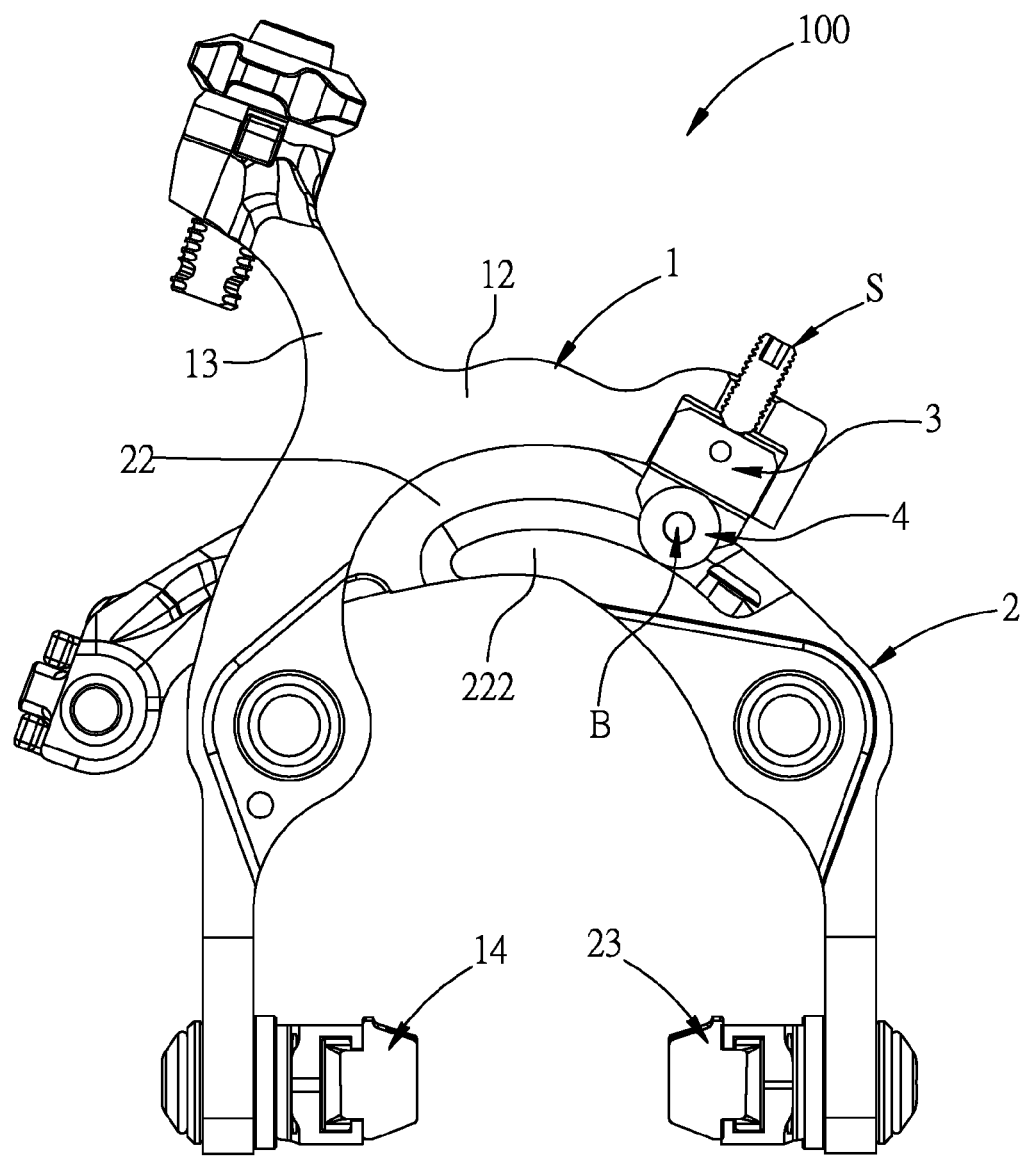
FIG. 5 is a rear view of the brake structure capable of adjusting a distance between two brake shoes of a bicycle according to present invention.
Figure 6:
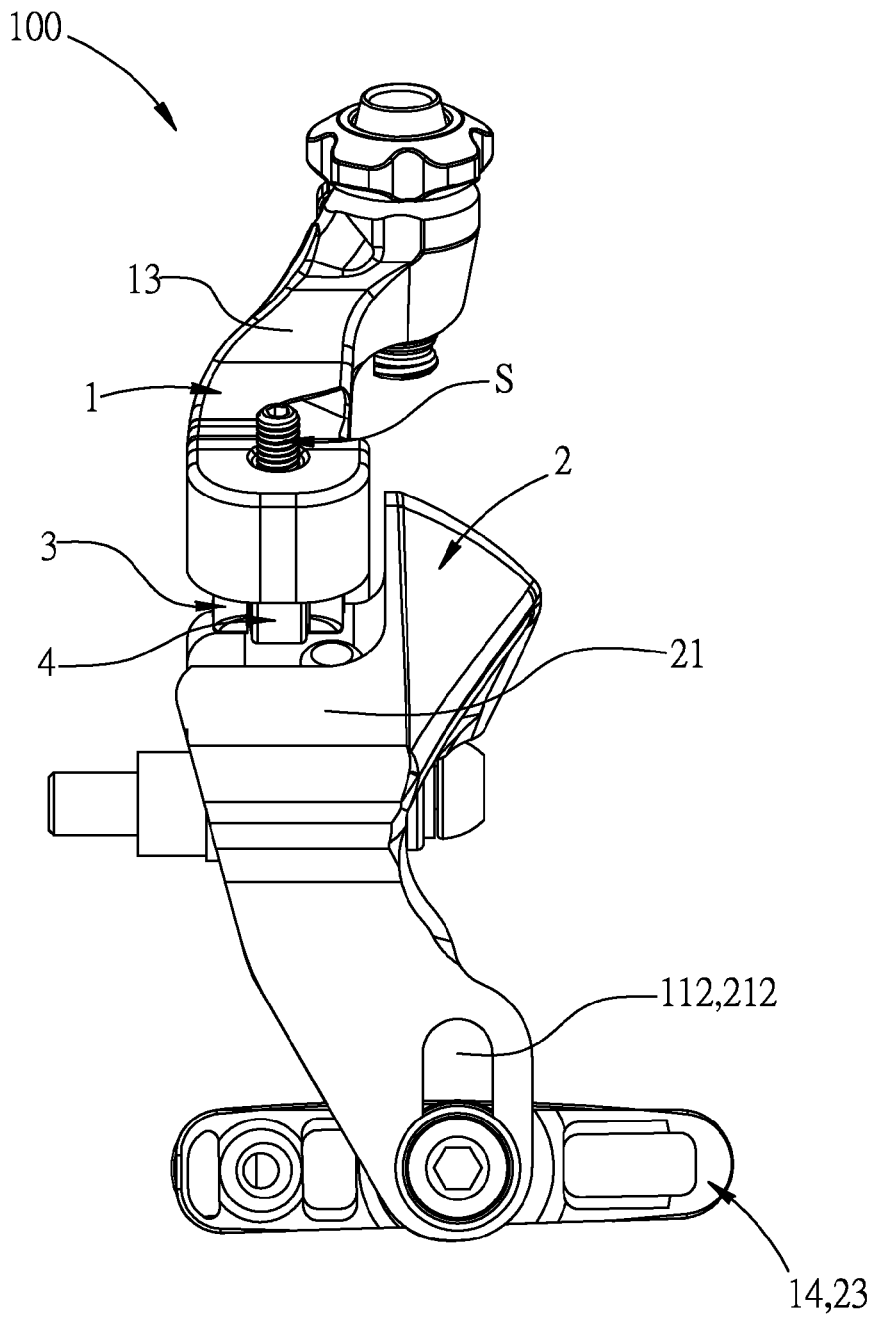
FIG. 6 is a side view of the brake structure capable of adjusting a distance between two brake shoes of a bicycle according to present invention.
Figure 7:
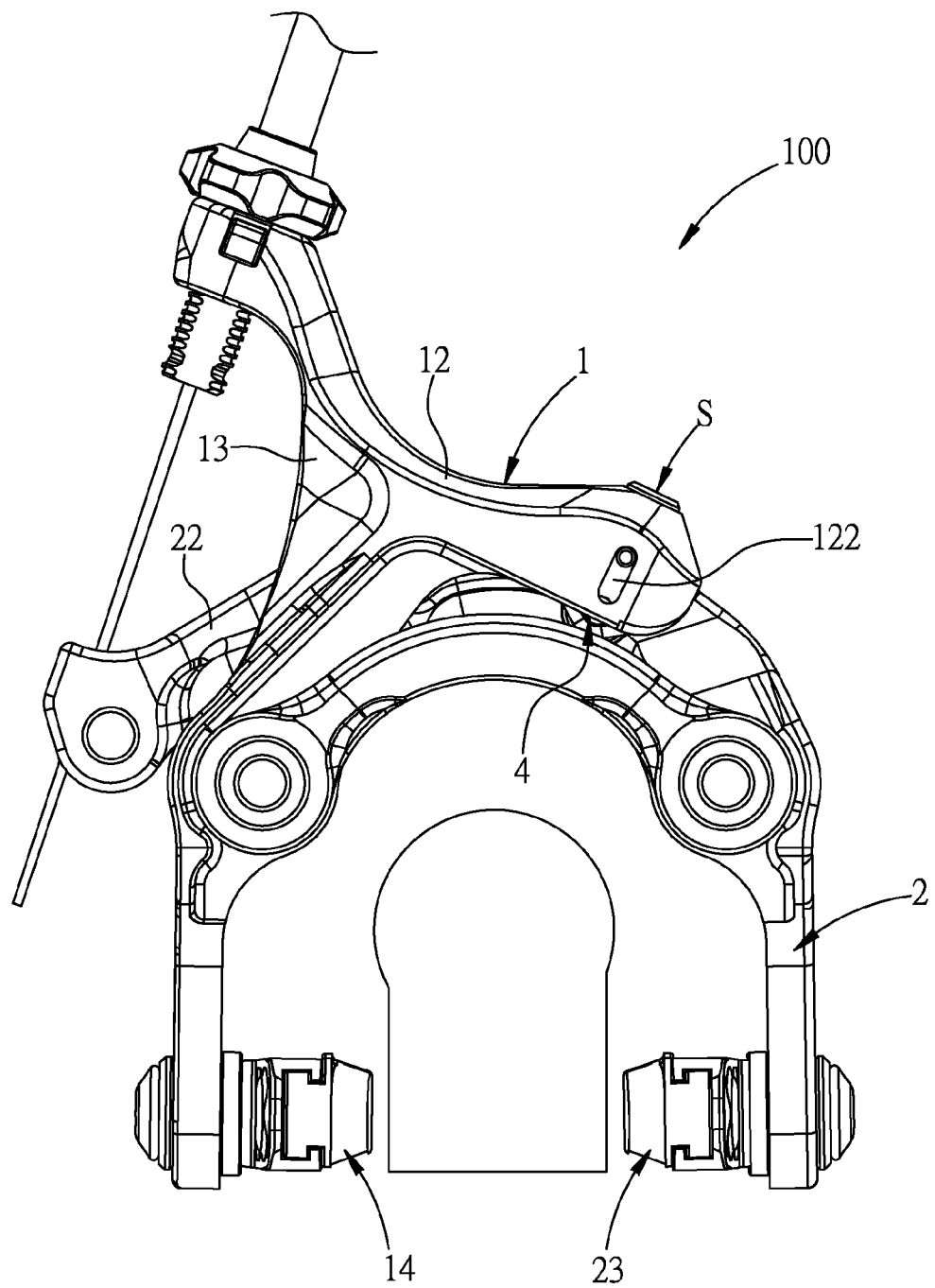
FIG. 7 is a schematic view of the brake structure capable of adjusting a distance between two brake shoes of a bicycle before adjusting according to present invention.
Figure 8:
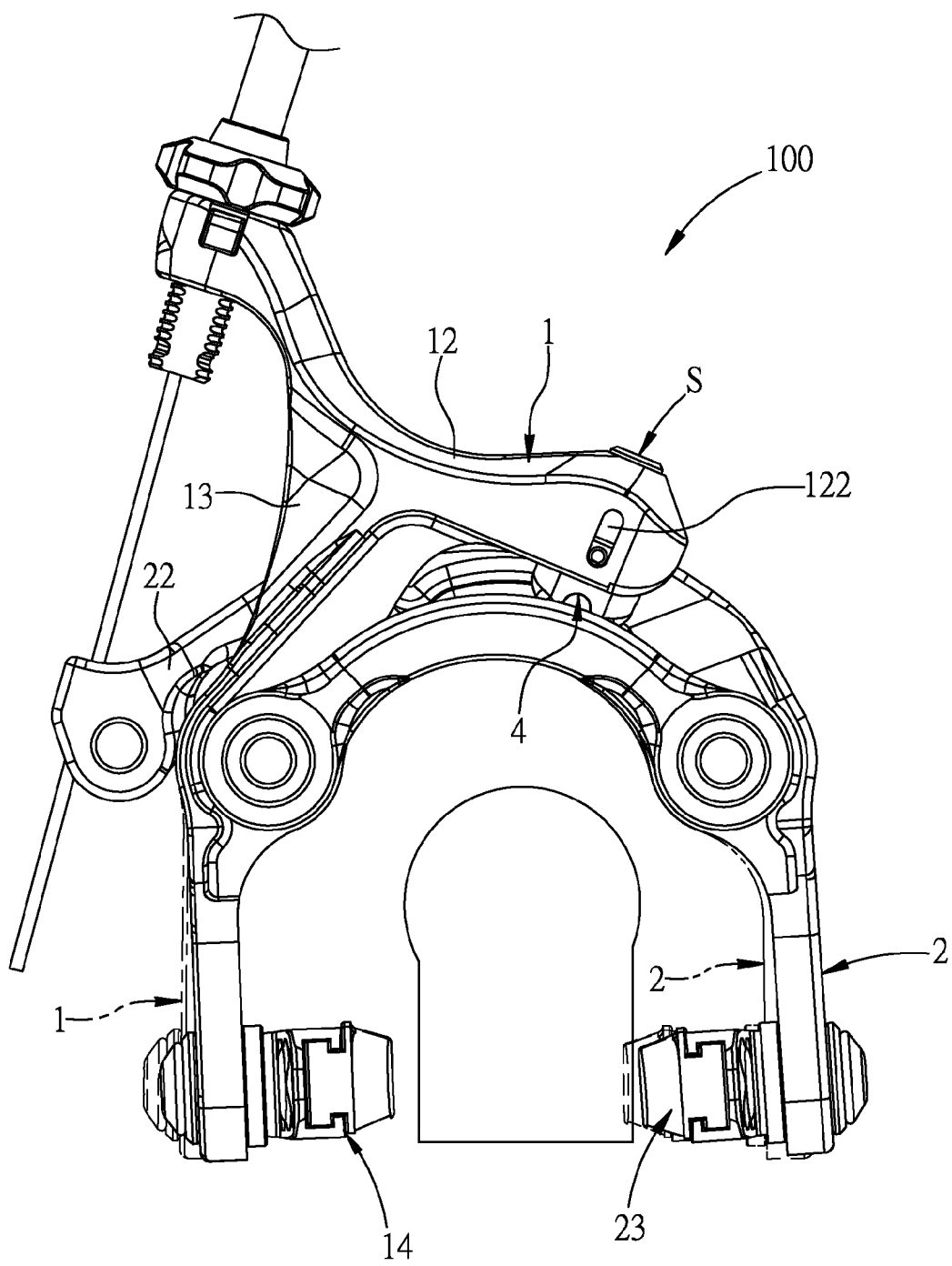
FIG. 8 is a schematic view of the brake structure capable of adjusting a distance between two brake shoes of a bicycle after adjusting with a longest distance according to present invention.
Figure 9:
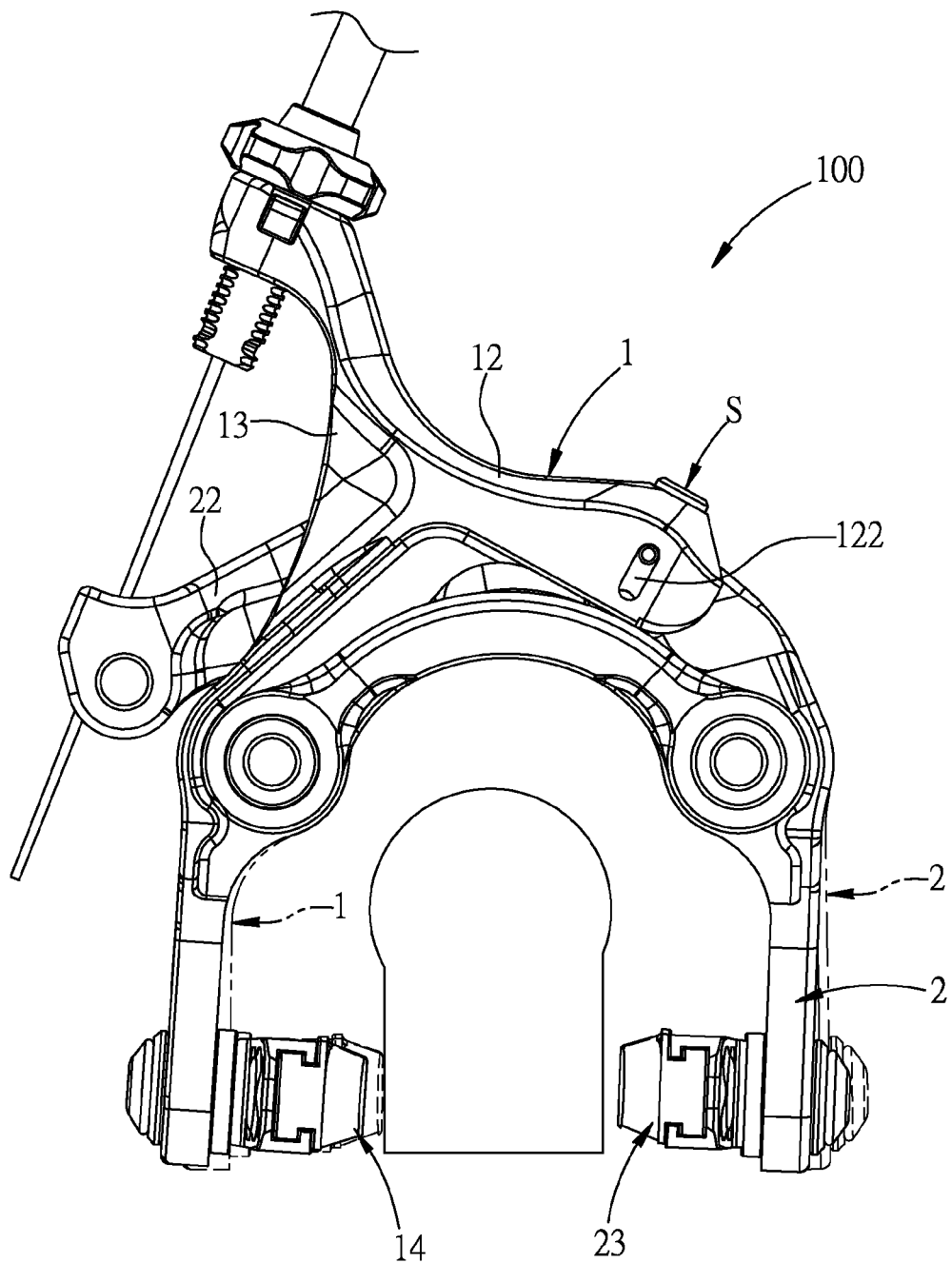
FIG. 9 is a schematic view of the brake structure capable of adjusting a distance between two brake shoes of a bicycle after adjusting with a shortest distance according to present invention.

FIG. 5 is a rear view of the brake structure capable of adjusting a distance between two brake shoes of a bicycle according to present invention. FIG. 6 is a side view of the brake structure capable of adjusting a distance between two brake shoes of a bicycle according to present invention. FIG. 7 is a schematic view of the brake structure capable of adjusting a distance between two brake shoes of a bicycle before adjusting according to present invention. FIG. 8 is a schematic view of the brake structure capable of adjusting a distance between two brake shoes of a bicycle after adjusting with a longest distance according to present invention. FIG. 9 is a schematic view of the brake structure capable of adjusting a distance between two brake shoes of a bicycle after adjusting with a shortest distance according to present invention.

Please refer to FIG. 1 to FIG. 9, the brake structure 100 comprises a first arm 1, a second arm 2, a push member 3, and a roller 4.

The first arm 1 may have a first lower extending portion 11, a first upper extending portion 13 connected with the first lower extending portion 11, and a first right extending portion 12 connected to the connection of the first lower extending portion 11 and the first upper extending portion 13. A first pivoting hole 111 may be disposed at one end of the first lower extending portion 11 adjacent to the first upper extending portion 13 in a front-back direction. A first connecting hole 112 may be disposed at one end of the first lower extending portion 11 distant from the first upper extending portion 13 in a left-right direction for connecting a first brake shoe 14. An adjusting hole 121 may be disposed at one end of the first right extending portion 12 distant from the first lower extending portion 11 in an up-down direction. And an elongated round hole 122 may be disposed at one end of the first right extending portion 12 distant from the connection of the first lower extending portion 11 and the first upper extending portion 13, and an axial direction of the elongated round hole 122 is in the up-down direction.

The second arm 2 may have a second lower extending portion 21 and a second left extending portion 22. A second pivoting hole 211 may be disposed at one end of the second lower extending portion 21 adjacent to the second left extending portion 22 in the front-back direction. A second connecting hole 212 is corresponding to the first connecting hole 112 and disposed at one end of the second lower extending portion 21 distant from the second left extending portion 22 for connecting a second brake shoe 23. One end of the second left extending portion 22 distant from the second lower extending portion 21 and one end of the first upper extending portion 13 distant from the first lower extending portion 11 are separatedly connected with a brake cable (not shown). And one end of the second left extending portion 22 adjacent to the second lower extending portion 21 may form a vertical wall 221 and a horizontal wall 222 connected with each other.

The push member 3 may be disposed between the end of first right extending portion 12 distant from the first lower extending portion 11 and the horizontal wall 222. A bolt member B may be passed through the elongated round hole 122 and the push member 3 to fix the push member 3. A screw S may be adjustably disposed inside the adjusting hole 121 and against a top of the push member 3. And a concave portion 31 may be formed at the bottom of the push member 3.

The roller 4 may be pivotedly received in the concave portion 31 of the push member 3. Two ends of the roller 4 may be respectively and rollably against the horizontal wall 22 and the concave portion 31.

Preferably, the first pivoting hole 111 and the second pivoting hole 211 may be detachably fastened at a front fork (not shown) or a rear fork (not shown).

When the screw S is screwed in the adjusting hole 121, the screw S is against and pushing the push member 3, the concave portion 31 of the push member 3 is pushing the roller 4, and further the roller 4 is rolling to push the horizontal wall 222 to adjust a distance between the first brake shoe 14 and the second brake shoe 23 to be shorter.

When the screw S is screwed out of the adjusting hole 121, the push member 3 is pushed back toward the bolt member B, and further the horizontal wall 222 is pushed back toward the push member 3 to roll the roller 4 to adjust the distance between the first brake shoe 14 and the second brake shoe 23 to be longer.

Therefore, it is not necessary to detach the brake structure 1 and easy to adjust the distance between the first brake shoe 14 and the second brake shoe 23.

What is claimed is:

1. A brake structure capable of adjusting a distance between two brake shoes of a bicycle, comprising:

a first arm, having a first lower extending portion, a first upper extending portion connected with the first lower extending portion, and a first right extending portion connected to the connection of the first lower extending portion and the first upper extending portion, a first pivoting hole is disposed at one end of the first lower extending portion adjacent to the first upper extending portion in a front-back direction, a first connecting hole is disposed at one end of the first lower extending portion distant from the first upper extending portion in a left-right direction for connecting a first brake shoe, an adjusting hole is disposed at one end of the first right extending portion distant from the first lower extending portion in an up-down direction, and an elongated round hole is disposed at one end of the first right extending portion distant from the connection of the first lower extending portion and the first upper extending portion, and an axial direction of the elongated round hole is in the up-down direction;

a second arm, having a second lower extending portion and a second left extending portion, a second pivoting hole is disposed at one end of the second lower extending portion adjacent to the second left extending portion in the front-back direction, a second connecting hole is corresponding to the first connecting hole and disposed at one end of the second lower extending portion distant from the second left extending portion for connecting a second brake shoe, one end of the second left extending portion distant from the second lower extending portion and one end of the first upper extending portion distant from the first lower extending portion are separatedly connected with a brake cable, and one end of the second left extending portion adjacent to the second lower extending portion forms a vertical wall and a horizontal wall connected with each other;

a push member, disposed between the end of first right extending portion distant from the first lower extending portion and the horizontal wall, a bolt member is passed through the elongated round hole and the push member to fix the push member, a screw is adjustably disposed inside the adjusting hole and against a top of the push member, and a concave portion is formed at the bottom of the push member; and a roller, pivotedly received in the concave portion of the push member, two ends of the roller are respectively and rollably against the horizontal wall and the concave portion;

wherein when the screw is screwed in the adjusting hole, the screw is against and pushing the push member, the concave portion of the push member is pushing the roller, and further the roller is rolling to push the horizontal wall to adjust a distance between the first brake shoe and the second brake shoe to be shorter;

wherein when the screw is screwed out of the adjusting hole, the push member is pushed back toward the bolt member, and further the horizontal wall is pushed back toward the push member to roll the roller to adjust the distance between the first brake shoe and the second brake shoe to be longer; and wherein the first pivoting hole and the second pivoting hole are detachably fastened at a front fork or a rear fork.

* * * * *